United States Patent
Yamamoto (10) Patent No.: US 6,585,380 B2
(45) Date of Patent: Jul. 1, 2003

(54) ILLUMINATION APPARATUS AND PROJECTOR TYPE DISPLAY APPARATUS USING THE SAME

(75) Inventor: Chikara Yamamoto, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/974,835

(22) Filed: Oct. 12, 2001

(65) Prior Publication Data

US 2002/0033933 A1 Mar. 21, 2002

Related U.S. Application Data

(63) Continuation-in-part of application No. 09/893,011, filed on Jun. 28, 2001.

(30) Foreign Application Priority Data

Jul. 19, 2000 (JP) ........................................ 2000-218924

(51) Int. Cl.$^7$ ............................................... G03B 21/28
(52) U.S. Cl. ............................................. 353/98; 99/38
(58) Field of Search .............................. 353/30, 38, 94, 353/98, 99, 91

(56) References Cited

U.S. PATENT DOCUMENTS

| | | | | |
|---|---|---|---|---|
| 5,098,184 A | * | 3/1992 | van den Brandt et al. .. | 353/102 |
| 5,300,966 A | * | 4/1994 | Uehira et al. ................. | 353/30 |
| 5,765,934 A | * | 6/1998 | Okamori et al. .............. | 353/94 |
| 6,222,674 B1 | * | 4/2001 | Ohta ............................. | 353/94 |
| 6,224,217 B1 | * | 5/2001 | Tanaka ......................... | 353/94 |

FOREIGN PATENT DOCUMENTS

| | | |
|---|---|---|
| JP | 6-265887 | 9/1994 |
| JP | 11-044920 | 2/1999 |
| JP | 2000-3612 | 1/2000 |

* cited by examiner

*Primary Examiner*—William Dowling
(74) *Attorney, Agent, or Firm*—Snider & Associates; Ronald R. Snider (57) ABSTRACT

An illumination apparatus comprises a plurality of light source sections, an integrator section, and a mirror element. Each light source section is constituted by a luminous body and a reflector comprising an ellipsoidal surface having one focal point located near the center of gravity of the luminous body. The integrator section is constituted by at least two integrator plates, arranged in the optical axis direction of light, for homogenizing the quantity of light emitted from the light source sections. The mirror element has a reflecting surface near the other focal point of the ellipsoidal surface of at least one reflector, and reflects the luminous flux from the light source group toward the integrator section. The optical axis of the illumination apparatus as a whole and the optical axis of at least one reflector form a predetermined angle therebetween.

16 Claims, 9 Drawing Sheets

ILLUMINATION APPARATUS AND PROJECTOR TYPE DISPLAY APPARATUS USING THE SAME

RELATED APPLICATIONS

This application is a Continuation-in-part of U.S. patent application Ser. No. 09/893,011 filed Jun. 28, 2001. This application claims the priority of Japanese Patent Application No. 2000-218924 filed on Jul. 19, 2000, which is incorporated herein by reference. A certified copy of the Japanese application has been filed in Ser. No. 09/893,011.

BACKGROUND OF THE INVENTION

1. Field of the Invention

The present invention relates to an illumination apparatus, and a projection type display apparatus which modulates the output light from the illumination apparatus according to predetermined image information by using a light valve and projects thus modulated light onto a screen; and, in particular, to a configuration of an illumination apparatus comprising a plurality of light source sections.

2. Description of the Prior Art

Methods using a lens array or a lenticular plate have conventionally been known as an integrator type in illumination apparatus employed in projection type display apparatus. Even when a light source having uneven light-distributing characteristics such as a metal halide lamp, xenon lamp, or halogen lamp is used, this type of methods can yield an illumination apparatus which can eliminate the unevenness in illumination on the light valve caused by light-distributing characteristics of the light source.

Such an illumination apparatus comprises a first integrator plate (known as a second flyeye or the like in general) and a second integrator plate (known as a first flyeye or the like in general) successively disposed in this order downstream a light source section using a reflector. The first integrator plate is constituted by a plurality of two-dimensionally arranged lens elements, each having a form substantially similar to that of the liquid crystal display panel. A luminous flux with a large unevenness in brightness emitted from the light source section is divided by the first integrator plate into partial luminous fluxes whose number is identical to the number of lens elements in the first integrator plate. The unevenness in brightness of partial luminous fluxes is smaller than that of the undivided luminous flux. The partial luminous fluxes form respective secondary light sources on the surface of the second integrator plate (which becomes conjugate with the pupil surface of a projection lens), which are emitted toward the illuminating region by way of the second integrator plate and a field lens, so as to be superposed on each other, whereby illumination with a smaller unevenness in brightness can be realized.

Known as the projection type display apparatus using two integrator plates as mentioned above is one having a plurality of light sources arranged symmetrical about the optical axis in order to secure the quantity of illumination light, and so forth (Japanese Unexamined Patent Publication No. 6-265887).

In the case of an illumination apparatus comprising a single light source, the unevenness in illumination caused by light-distributing characteristics of the light source can effectively be eliminated by the above-mentioned integrator type. In an illumination apparatus in which a plurality of light sources are arranged symmetrical about the optical axis, however, a new intensity distribution occurs due to light-distributing characteristics of the light sources. Namely, since individual light sources having respective intensity distributions different from each other are arranged symmetrical about the optical axis, a part having a high intensity occurs at a position not near the optical axis but separated from the optical axis by a predetermined distance on the pupil surface of the projection lens, which becomes conjugate with the surface of the second integrator plate. However, the imaging performance of the projection lens is higher in the vicinity of the optical axis and becomes lower as being distanced further therefrom. If a part having a higher intensity, i.e., a part governing the imaging performance, exists at a position separated from the optical axis on the pupil surface by a predetermined distance as mentioned above, it becomes harder to fully exhibit the imaging performance inherent in the projection lens.

A conventional example which can deal with such a problem caused by a plurality of light sources is the illumination apparatus and the projection type display apparatus using the same disclosed in Japanese Unexamined Patent Publication No. 2000-3612. This illumination apparatus comprises a plurality of light source sections each comprising an ellipsoidal mirror having a first focal point near the center of gravity of a luminous body, whereas the luminous flux from each light source section is reflected toward the integrator by a reflecting prism having a reflecting surface near a second focal point of each ellipsoidal mirror. Therefore, the secondary light source of luminous body formed on the reflecting surface of the reflecting prism is located nearer to the optical axis of the illumination apparatus than is the luminous body itself, whereby the position of the secondary light source can be taken as the light source position in its downstream optical systems. Thus, while this apparatus is a bright illumination apparatus comprising a plurality of light sources, a light spot is formed by the luminous flux from each light source section at a position near the optical axis on the pupil surface of the projection lens, whereby the imaging performance of the projection lens can be made favorable.

However, the apparatus mentioned above aims at improving the uniformity in illuminance and color of the illumination light. Therefore, it is considered important for luminous body images formed on the projection lens pupil surface to be arranged substantially symmetrical about the optical axis even when a plurality of lamps are used. Namely, the luminous body images are arranged substantially symmetrical about the optical axis, whereby the light spot formed by the luminous flux from each light source section is resultantly positioned near the optical axis. Hence, this apparatus is not necessarily conceived to cause the above-mentioned projection lens to fully exhibit its imaging performance.

As mentioned above, the imaging performance of projection lens is higher in the vicinity of the optical axis and becomes lower as being separated farther therefrom. Therefore, in order to utilize the imaging performance of the projection lens most effectively, it is desirable that the part having a higher luminous flux intensity be transmitted through the pupil surface of the projection lens at a position as close to the optical axis as possible. Though the light spot formed by the luminous flux from each light source section can be formed at a position close to the optical axis to a certain extent in this conventional example, there is a limit. Namely, as the light spot approaches the optical axis, the position at which the luminous flux from the light source section is reflected on each reflecting surface of the reflecting prism inevitably approaches a vertex of the reflecting prism formed by reflecting surfaces of the reflecting prism. However, a certain area is necessary for reflecting a luminous flux even in the vicinity of the focal position of the luminous flux, whereby no luminous flux can be reflected by a vertex of the reflection prism.

Therefore, a paradigm shift is necessary for causing the part with a higher intensity of the luminous flux from a light source section to pass through the pupil surface of the projection lens at a position nearer to the optical axis, and further effectively utilizing the imaging performance of the projection lens.

Commonly assigned Japanese Unexamined Patent Publication No. 11-44920 discloses a projection type display apparatus proposed as one solving the above-mentioned problem caused by a plurality of light sources. This projection type display apparatus is configured such that the luminous fluxes from each light source section is moved in an integrator section so as to approach the optical axis of the integrator section while the rate of change in the distance from the luminous flux center to the optical axis becomes the rate of change in the diameter of the luminous flux or greater. As a consequence, in the pupil surface of the projection lens, the light spot caused by the luminous flux from each light source section is formed at a position near the optical axis, whereby the imaging performance of the projection lens can be made favorable.

In this conventional example, the luminous flux from each light source section is moved as mentioned above in the integrator section. Specifically, two wedge-like prisms are disposed in the integrator section or each of the lenses constituting the flyeye is shaped into a wedge-like prism itself, whereby the effects mentioned above can be obtained.

SUMMARY OF THE INVENTION

In view of such circumstances, it is an object of the present invention to provide an illumination apparatus which can easily be made smaller and can cause the projection lens to fully exhibit the imaging performance inherent therein by placing the part with a higher light intensity corresponding to each light source as nearer to the optical axis of the illumination apparatus as possible when a plurality of light sources are arranged symmetrical about the optical axis while the illumination light is homogenized by the integrator type.

Also, in a similar case, it is an object of the present invention to provide, in a configuration easier to assemble at a lower cost as compared with conventional ones, an illumination apparatus which can cause the projection lens to fully exhibit the imaging performance inherent therein by placing the part with a higher light intensity corresponding to each light source nearer to the optical axis of the illumination apparatus on the surface of the second integrator plate, which is conjugate with the pupil surface of the projection lens.

It is another object of the present invention to provide a projection type display apparatus comprising the above-mentioned illumination apparatus.

The present invention provides an illumination apparatus comprising:

a light source group in which a plurality of light source sections, each constituted by a luminous body and a reflector comprising an ellipsoidal surface having one focal point located near a center of gravity of the luminous body, are arranged;

an integrator section, constituted by at least two integrator plates, for homogenizing a quantity of light emitted from the light source group, the integrator section being arranged in an optical axis direction of the light; and at least one mirror element, having a reflecting surface near the other focal point of the ellipsoidal surface of at least one reflector, for reflecting a luminous flux from the light source group toward the integrator section;

wherein the illumination apparatus as a whole has an optical axis forming a predetermined angle with an optical axis of the at least one reflector.

Preferably, at least one lens for emitting the luminous flux from the mirror element toward the integrator section as a substantially parallel luminous flux is disposed on the mirror element side of the integrator section.

Preferably, the lens is formed integrally with the integrator plate on the mirror element side in the integrator section on the surface of the integrator plate facing the mirror element.

The lens may be formed integrally with the integrator plate from a plastic material. Preferably, the lens has an aspheric surface.

The light source group may comprise at least two light source sections arranged such that respective luminous fluxes therefrom are incident on the lens at an angle by which a center axis of each of the luminous fluxes substantially intersects the optical axis of the lens.

The light source group may comprise at least two light source sections, whereas the mirror element has a reflecting surface near the other focal point of the ellipsoidal surface of each of the reflectors of the two light source sections so as to reflect the luminous flux from the light source group toward the integrator section.

The present invention provides a projection type display apparatus comprising the above-mentioned illumination apparatus, a light valve for modulating output light from the integrator section according to predetermined image information, and a projection lens for projecting onto a screen an optical image formed by the light modulated by the light valve.

Here, "the illumination apparatus as a whole has an optical axis forming a predetermined angle with the optical axis of the at least one reflector" indicates that, in a state where the luminous flux from the reflector is assumed to be focused once and then become incident on the integrator section while being kept on linearly advancing without the mirror element, the optical axis of the illumination apparatus as a whole and the optical axis of the reflector have such an angle therebetween that the distance from the optical axis of the whole illumination apparatus to the center of gravity of the luminous body is greater than the distance from the optical axis of the whole illumination apparatus to the focal point. Namely, in thus assumed state, the optical axis of the reflector intersects the optical axis of the whole illumination apparatus on its extension directed to the focal point.

The present invention provides an illumination apparatus comprising:

a light source group in which a plurality of light source sections, each constituted by a luminous body and a reflector comprising a parabolic surface for emitting a luminous flux from the luminous body to a front side of an optical axis, are arranged;

an integrator section, constituted by at least two integrator plates, for homogenizing in a cross section perpendicular to the optical axis a quantity of light emitted from the light source group, the integrator section being arranged in the optical axis direction; and a parallel luminous flux approaching optical system comprising a plurality of first lens groups corresponding to the plurality of light source sections in the light source group substantially one by one and functioning to cause each of the luminous fluxes from the plurality of light source sections to form a focal point once; and at least one second lens group, disposed downstream the focal point, for emitting the luminous fluxes from the light source group toward the integrator section as a substantially parallel luminous flux;

wherein the optical axis of the whole illumination apparatus and optical axes of the light source section and first lens group forming a pair are substantially parallel to each other and satisfy the following conditional expression (1):

$$Saxis > Faxis \quad (1)$$

where

Saxis is the distance between the optical axis of the whole illumination apparatus and the optical axis of the light source section; and Faxis is the distance between the optical axis of the whole illumination apparatus and the optical axis of the first lens group.

Preferably, at least one mirror element, having a reflecting surface near at least one of the plurality of focal points caused by the plurality of first lens groups, for reflecting a luminous flux toward the second lens group is provided.

Preferably, the light source group comprises two light source sections, whereas the mirror element having reflecting surfaces near two focal points caused by the first lens groups corresponding to the light source sections one by one is provided.

Preferably, each of at least one first lens group and at least one second lens group is constituted by a single lens having substantially the same form. Preferably, at least one of the first and second lens groups is made of a single aspherical lens.

Preferably, at least one second lens group is integrally formed with the integrator plate on the light source group side in the integrator section at the surface thereof on the light source group side.

The present invention provides a projection type display apparatus comprising the above-mentioned illumination apparatus, a light valve for modulating output light from the integrator section according to predetermined image information, and a projection lens for projecting onto a screen an optical image formed by the light modulated by the light valve.

Here, the expression "the optical axis of the whole illumination apparatus and optical axes of the light source section and first lens group forming a pair are substantially parallel to each other" mentioned above refers to the case where the optical axis of the whole illumination apparatus, the optical axis of the light source section, and the optical axis of the first lens group corresponding to the light source section are substantially parallel to each other in a state where it is assumed that the positions of the light source section and the first lens group corresponding thereto would be located where the luminous flux from the light source section advances straightforward by way of the first lens group so as to be made incident on the second lens group and the integrator section with the mirror element being removed, if the luminous flux from the light source section is bent toward the second lens group due to the insertion of the mirror element.

DESCRIPTION OF THE PREFERRED EMBODIMENTS

Figure 1:
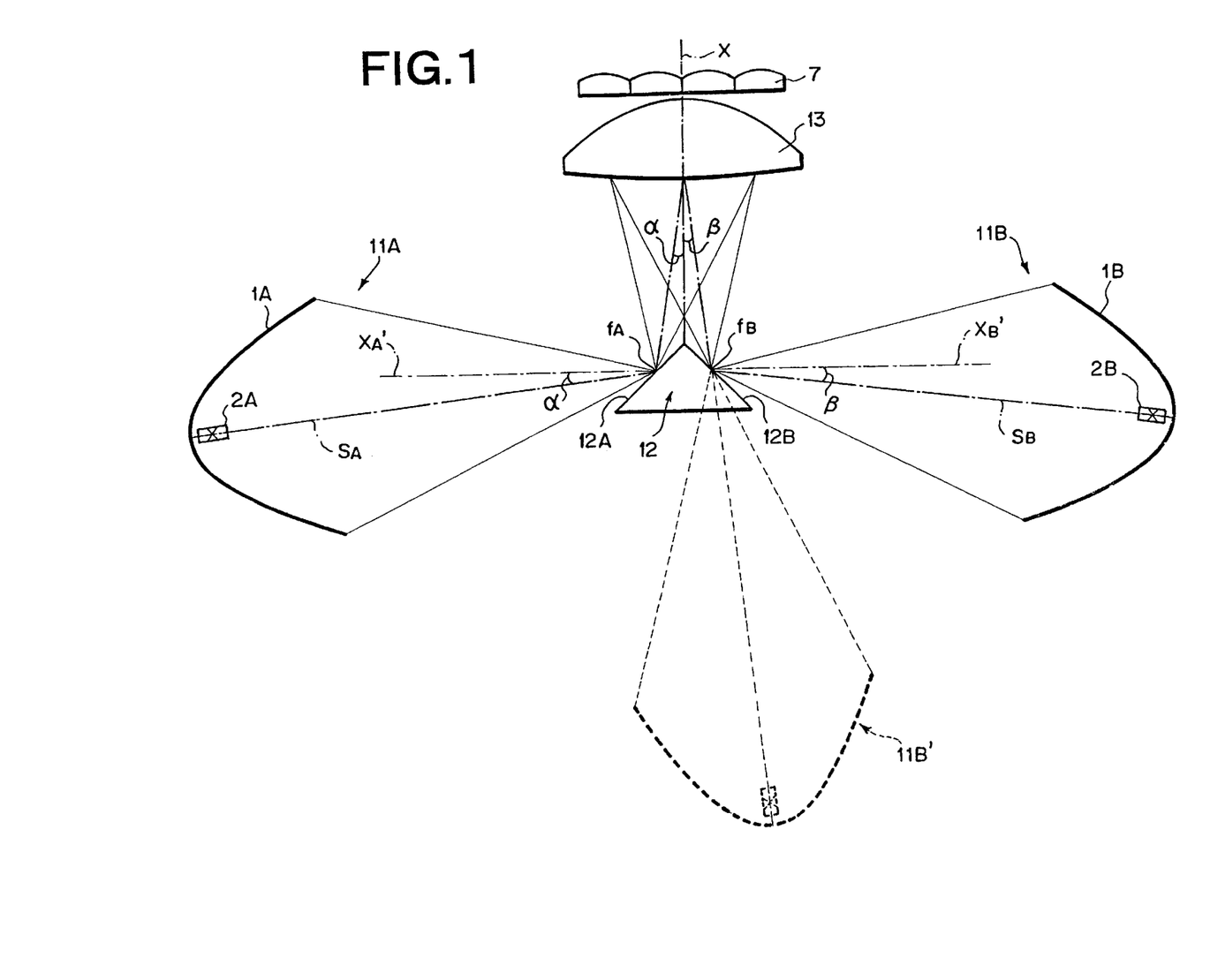
FIG. 1 is a schematic view showing the main part of the illumination apparatus in accordance with a first embodiment of the present invention.
Figure 2:
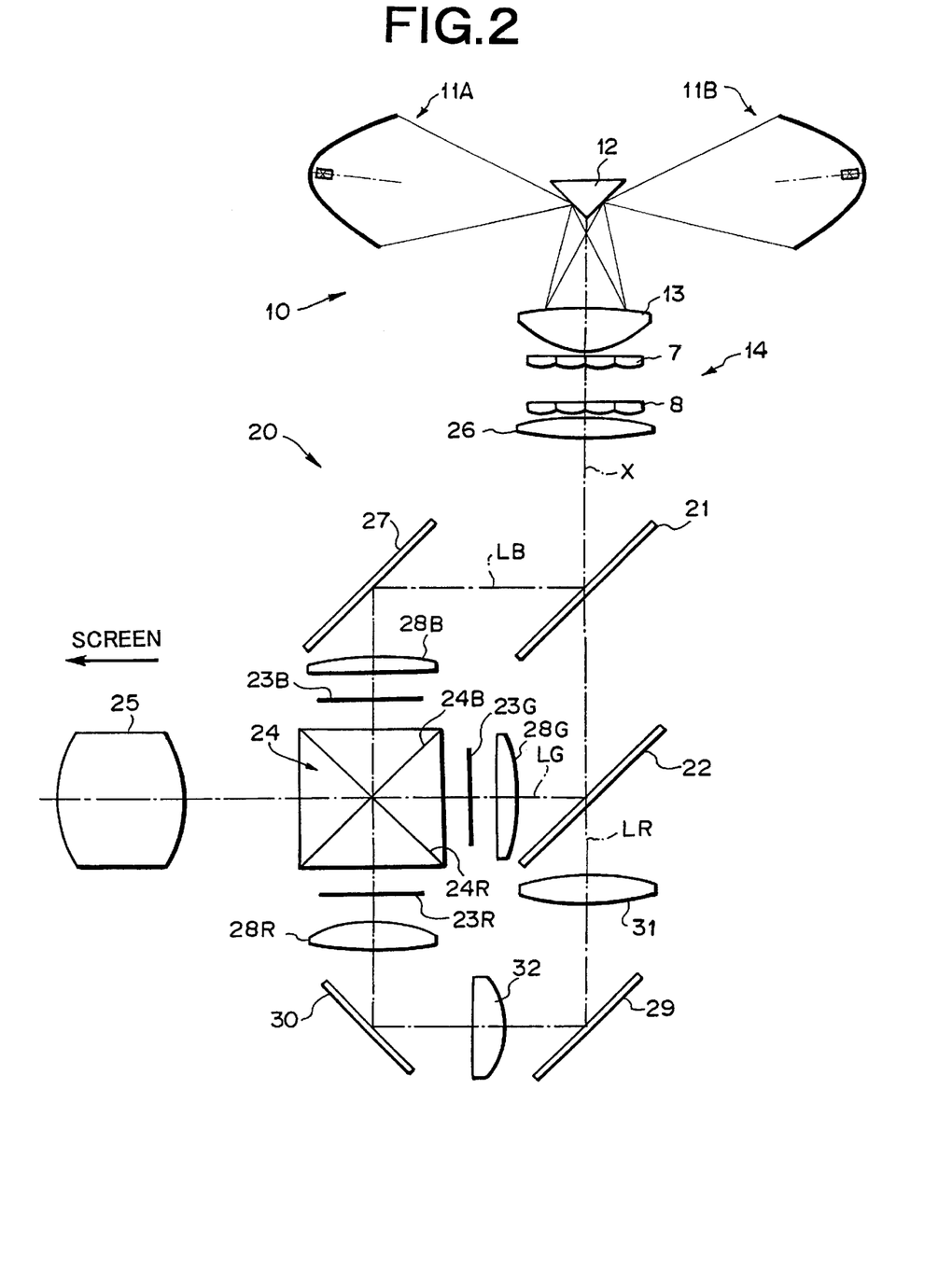
FIG. 2 is a schematic view showing the projection type display apparatus in accordance with the first embodiment of the present invention.

In the following, embodiments of the present invention will be explained with reference to the drawings. FIG. 2 is a view showing the configuration of the projection type display apparatus comprising the illumination apparatus in accordance with a first embodiment of the present invention. This projection type display apparatus comprises an illumination apparatus 10 in accordance with the first embodiment, and a projector section 20 for causing a luminous flux emitted from the illumination apparatus 10 and turned into uniform light to carry image information and projecting it onto a screen. FIG. 1 is an enlarged view of a part of the illumination apparatus 10 shown in FIG. 2. With reference to FIGS. 1 and 2, the illumination apparatus 10 will now be explained. In the illumination apparatus 10, a luminous flux emitted from its light source group is turned into a substantially parallel luminous flux whose part with a higher light intensity is placed nearer to the optical axis of an integrator section 14, i.e., the optical axis X of the whole illumination apparatus, before being made incident on the integrator section 14, and then is mixed at the integrator section 14 so as to homogenize the light quantity distribution.

Here, the light source group comprises a plurality of (two in this embodiment) light source sections 11A, 11B comprising luminous bodies 2A, 2B, each made of a discharge tube such as a xenon lamp or metal halide lamp, and reflectors 1A, 1B, each made of an ellipsoidal mirror, arranged symmetrical about the optical axis X of the illumination apparatus 10. The light-emitting source of the luminous body 2A, 2B is disposed on one focal point of the reflector 1A, 1B made of an ellipsoidal mirror. As a consequence, the luminous flux emitted from the luminous body 2A, 2B toward the rear side and outside of the optical axis of the reflector 1A, 1B, i.e., the optical axis $S_A$, $S_B$ of the light source section 11A, 11B, is reflected so as to be converged at the other focal point $f_A$, $f_B$ of the reflector 1A, 1B to form a secondary light source image.

A mirror element 12 has reflecting surfaces 12A, 12B located near the other focal points $f_A$, $f_B$ of the reflectors 1A, 1B, and reflects the luminous flux from each light source section 11A, 11B toward the integrator section 14. The respective divergent luminous fluxes from the focal points $f_A$, $f_B$ on the reflecting surfaces 12A, 12B are transmitted through a lens 13, so as to be made incident on the integrator section 14 as substantially parallel luminous fluxes. In this embodiment, the lens 13 is constituted by a single aspherical lens having a positive refracting power. The form of the aspheric surface is defined by the following aspheric surface form expression:

$$Z = \frac{\frac{Y^2}{R}}{1+\sqrt{1-K\frac{Y^2}{R^2}}} + AY^4 + BY^6 + CY^8 + DY^{10}$$

where

Z is the length of the perpendicular to a tangential plane (plane perpendicular to the optical axis) of an apex of the aspheric surface from a point on the aspheric surface having a height Y from the optical axis;

R is the paraxial radius of curvature of the aspheric surface;

Y is the height from the optical axis;

K is the eccentricity; and

A, B, C, and D are the fourth-, sixth-, eighth-, and tenth-order aspheric surface coefficients.

In FIG. 1, the lens 13 has the aspheric surface directed toward the integrator section 14. When the lens 13 has an aspheric surface, the aberration can be corrected favorably, and the illumination efficiency can be improved.

The upper part of Table 1 (follows) shows the radius of curvature R (mm) of each lens surface, center thickness D (mm) of the lens, and the refractive index $N_e$ of the lens at e-line concerning the lens usable as an example of the aspherical lens. In this table, the numbers referring to the symbols successively increase from the light source section side. The lower part of Table 1 shows the respective values of constants K, A, B, C, and D of the aspheric surface indicated by the aspheric surface form expression.

The integrator section 14 comprises two integrator plates (first and second flyeyes 8, 7) and a field lens 26 arranged in the optical axis X direction. The substantially parallel luminous flux from the lens 13 is divided by the second flyeye 7 into partial luminous fluxes whose number is identical to the number of lens elements in the second flyeye 7, whereby tertiary light source images of the luminous bodies 2A, 2B are formed on individual lens elements constituting the first flyeye 8. These partial luminous fluxes are superposed onto a liquid crystal panel 23, which will be explained later, by the first flyeye 8 and the field lens 26, whereby the light quantity is homogenized within a cross section of the illumination apparatus perpendicular to the optical axis X.

As depicted, this embodiment is configured such that the optical axis X of the whole illumination apparatus forms predetermined angles with the optical axes $S_A$, $S_B$ of the reflectors 1A, 1B, respectively. In the case of the light source section 11B, for example, the predetermined angle is expressed by the angle (β) formed between the optical axis X of the whole illumination apparatus and the optical axis $S_B$ of the reflector 1B in the state where, without the mirror element 12, the luminous flux from the reflector 1B is assumed to form the focal point $f_B$ and then become incident on the integrator section 14 by way of the lens 13 while being kept on linearly advancing. FIG. 1 shows the position of the light source section 11B and luminous flux lines therefrom as a light source section 11B' by broken lines. In thus assumed state, as shown in FIG. 1, the angle β is set to such an angle that the distance from the optical axis X of the whole illumination apparatus to the center of gravity of the luminous body 2B is longer than the distance from the optical axis X of the whole illumination apparatus to the focal point $f_B$. Also, as depicted, the optical axis $S_B$ of the reflector 1B intersects the optical axis X of the whole illumination apparatus on its extension directed to the focal point $f_B$.

In the state where the optical axis X is assumed to be bent by the mirror element 12, as depicted, the angle β can also be expressed as the angle formed between a dash-single-dot line $X_B'$ to which thus bent optical axis X is translated and the optical axis $S_B$ of the reflector 1B.

As mentioned above, the angle β is such an angle that the distance from the optical axis X of the whole illumination apparatus to the center of gravity of the luminous body 2B is longer than the distance from the optical axis X of the whole illumination apparatus to the focal point $f_B$. Consequently, the position of the secondary light sources of luminous body 2B formed on the reflecting surface 12B of the mirror element 12 is nearer to the optical axis X of the illumination apparatus than is the position of the luminous body 2B itself. Therefore, the position of secondary light sources can be taken as the light source position in the optical systems downstream thereof. Since the optical axis X of the whole illumination apparatus and the optical axis $S_A$ of the reflector 1A form an angle α therebetween, the luminous flux from the light source section 11A can also approach the optical axis X as shown in FIG. 1. Since the mirror element 12 is disposed, secondary light sources located nearer to the optical axis X as such can be obtained easily. As can be seen from FIG. 1, it is physically difficult to place the light source section 11A at a position symmetrical to the light source section 11B' about the optical axis X.

In this embodiment, secondary light sources can be disposed at positions nearer to the optical axis X than are the luminous bodies 2A, 2B as in the above-mentioned conventional example. Also, since the optical axis X of the whole illumination apparatus forms predetermined angles α, β with the optical axes $S_A$, $S_B$ of the reflectors 1A, 1B, respectively, the luminous fluxes from the reflectors 1A, 1B can approach the optical axis X to such an extent that the optical axes $S_A$, $S_B$ thereof substantially intersect the optical axis X at the time when they enter the lens 13 as shown in FIG. 1. This also means that the light spots of luminous fluxes from the reflectors 1A, 1B incident on the lens 13 are substantially superposed on each other at the entrance surface of the lens 13 as depicted.

The luminous fluxes entering the lens 13 in such a state and then emitted as substantially parallel luminous fluxes toward the second flyeye 7 are those in which a part having a higher intensity is collected near the optical axis X of the illumination apparatus. In the illumination apparatus of this embodiment, the part of luminous flux having a higher intensity can also pass through the surface of the first flyeye 8, which becomes conjugate with the pupil surface of a projection lens 25, at a position near the optical axis. When the part having a higher intensity is collected in the vicinity of the optical axis on the pupil surface of the projection lens 25 as such, the imaging performance of the projection lens 25, which is higher in the vicinity of the optical axis and becomes lower as being separated farther therefrom, can fully be exhibited.

In terms of the configuration downstream the integrator section 14, it is desirable that the luminous fluxes from the light source sections 11A, 11B be substantially parallel luminous fluxes at the time when entering the second flyeye 7. Therefore, these luminous fluxes are required to have angles α, β which do not become too large at the time when entering the lens 13. When the reflectors 1A, 1B are to be disposed such that the optical axes $S_A$, $S_B$ simply incline with respect to the optical axis X and superpose light spots onto the entrance surface of the lens 13, it will be sufficient if the angles α, β are made greater, without requiring the mirror element 12 to be disposed. In order for the angles α, β to be made as small as possible while the light spots are superposed as being centered at the optical axis X, the configuration comprising the light source sections 11A, 11B inclined with respect to the optical axis X, and the mirror as in this embodiment is effective.

A projection type display apparatus comprising such an illumination apparatus 10 will now be explained with reference to FIG. 2. As mentioned above, luminous fluxes in which the light quantity is homogenized and the part having a higher intensity is collected in the vicinity of the optical axis of the illumination apparatus 10 are made incident on the projector section 20. The projector section 20 comprises a B/GR separating dichroic mirror 21 for separating the luminous flux homogenized by the integrator section 14 into a B component LB and GR components LG, LR; a G/R separating dichroic mirror 22 for separating the GR components LG, LR emitted from the B/GR separating dichroic mirror 21 into a G component LG and an R component LR; a liquid crystal panel 23B for displaying an image for the B component; a liquid crystal panel 23G for displaying an image for the G component; a liquid crystal panel 23R for displaying an image for the R component; a tricolor-combining prism 24 for combining the luminous flux components LB, LG, LR carrying image information after being transmitted through the respective liquid crystal panels 23B, 23G, 23R; and a projection lens 25 for forming an image of the luminous flux composed by the tricolor-combining prism 24 onto a screen.

The projector section 20 further comprises a total reflection mirror 27 by which the B component LB emitted from the B/GR separating dichroic mirror 21 is reflected toward the liquid crystal panel 23B; a field lens 28B by which the B component LB reflected by the total reflection mirror 27 is turned into parallel light; a field lens 28G by which the G component LG emitted from the G/R separating dichroic mirror 22 is turned into parallel light; total reflection mirrors 29, 30 by which the R component LR emitted from the G/R separating dichroic mirror 22 is reflected toward the liquid crystal panel 23R; and a field lens 28R by which the R component LR emitted from the G/R separating dichroic mirror 22 is turned into parallel light.

Though only the R component LR has a different optical path length to the tricolor-combining prism 24 in the projector section 20, a field lens 31 is disposed between the G/R separating dichroic mirror 22 and the total reflection mirror 29, and a relay lens 32 is disposed between the total reflection mirrors 29 and 30, so that the field lens 31 and the relay lens 32 correct the imaging of the R component LR so as to make it apparently identical to that of the B component LB and G component LG. The tricolor-combining prism 24 is a cross prism having a dichroic surface 24B for reflecting the B component LB and a dichroic surface 24R for reflecting the R component LR.

As mentioned above, the illumination apparatus 10 in the projection type display apparatus in accordance with the first embodiment is configured such that a plurality of light source sections 11A, 11B are arranged symmetrical about the optical axis, whereas a part having a higher intensity is collected at a position nearer to the optical axis X of the substantially parallel luminous flux incident on the second flyeye 7. Therefore, on the pupil surface of the projection lens 25 in the projection type display apparatus, which becomes conjugate with the surface of the first flyeye 8, the part having a higher intensity is collected, whereby a bright projection type display apparatus in which the projection lens 25 has a favorable imaging performance can be obtained.

Figure 9:
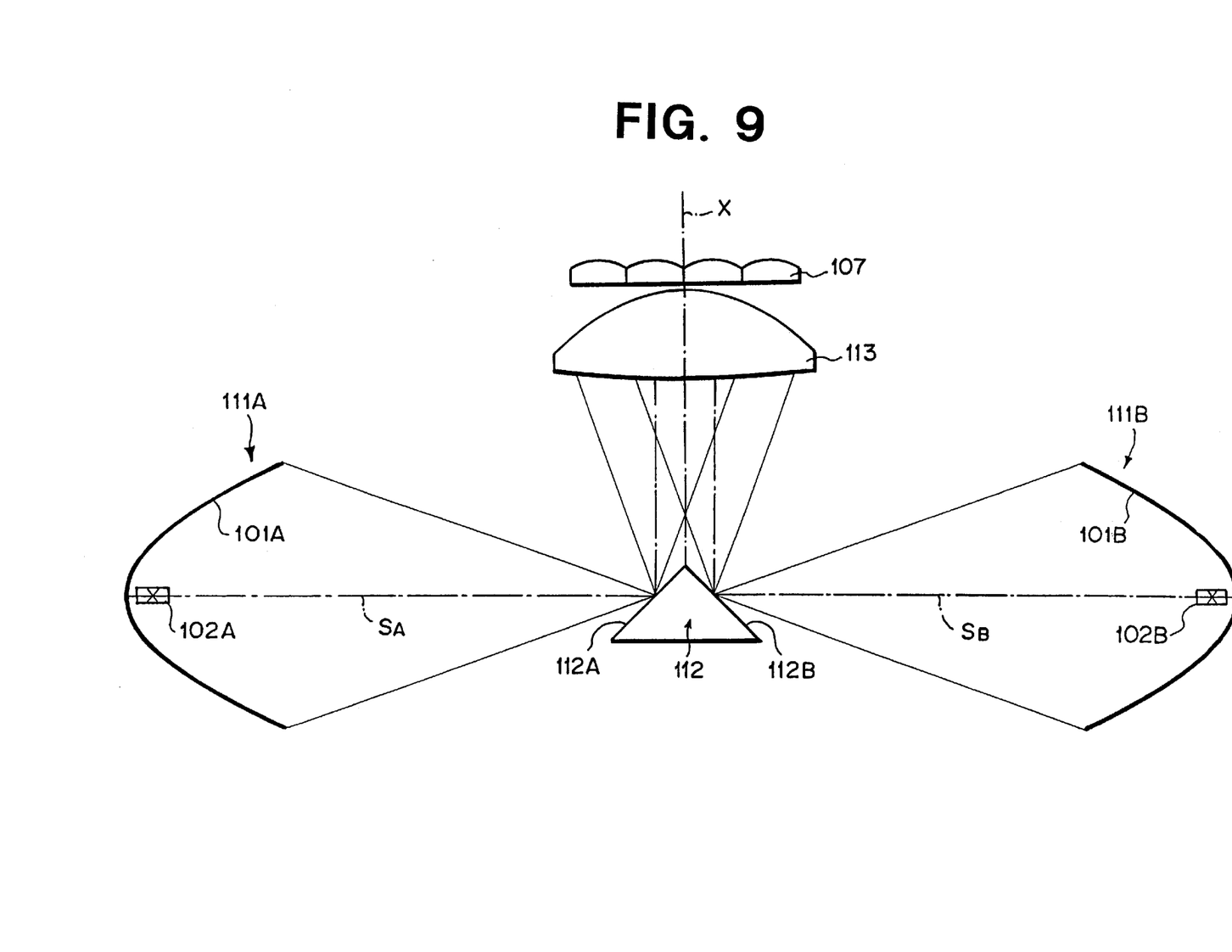
FIG. 9 is a schematic view showing the main part of a conventional illumination apparatus.

For comparison with this embodiment, FIG. 9 shows the configuration of the corresponding parts in the illumination apparatus in accordance with the above-mentioned conventional example. In this illumination apparatus, members having the same names and functions as those of the members explained in the illumination apparatus in accordance with the above-mentioned embodiment are referred to with numerals having last two digits identical to those of the latter, without repeating their detailed explanations. As shown in FIG. 9, while a mirror element 112 is disposed as in the above-mentioned embodiment so as to place secondary light source images of luminous bodies 102A, 102B nearer to the optical axis X of the illumination apparatus in the conventional example, light source sections 111A, 111B are disposed such that the optical axes $S_A$, $S_B$ of reflectors 101A, 101B and the optical axis X of the illumination apparatus are parallel to each other, which differs from the above-mentioned embodiment.

Therefore, while the light spots of the luminous fluxes incident on the lens 13 from the light source sections 11A, 11B can be superposed on each other so as to substantially coincide with each other at the entrance surface in accordance with the present invention, the light spots of the luminous fluxes incident on the lens 113 from the light source sections 111A, 111B are superposed on each other only partly at the entrance surface. Consequently, in order for the same quantity of light to be transmitted through the entrance surface, the conventional example is required to utilize luminous fluxes located farther from the optical axis X. Namely, when the lenses 13, 113 having the same size are used as shown in FIGS. 1 and 9, the center part of lenses can be utilized more efficiently in the above-mentioned embodiment (which is similarly applicable to lenses downstream thereof as well). Also, the flyeyes 7, 8 of the integrator section and the lenses 12, 26 upstream and downstream the integrator section in the above-mentioned embodiment can be made smaller than those in the conventional example.

Figure 4:
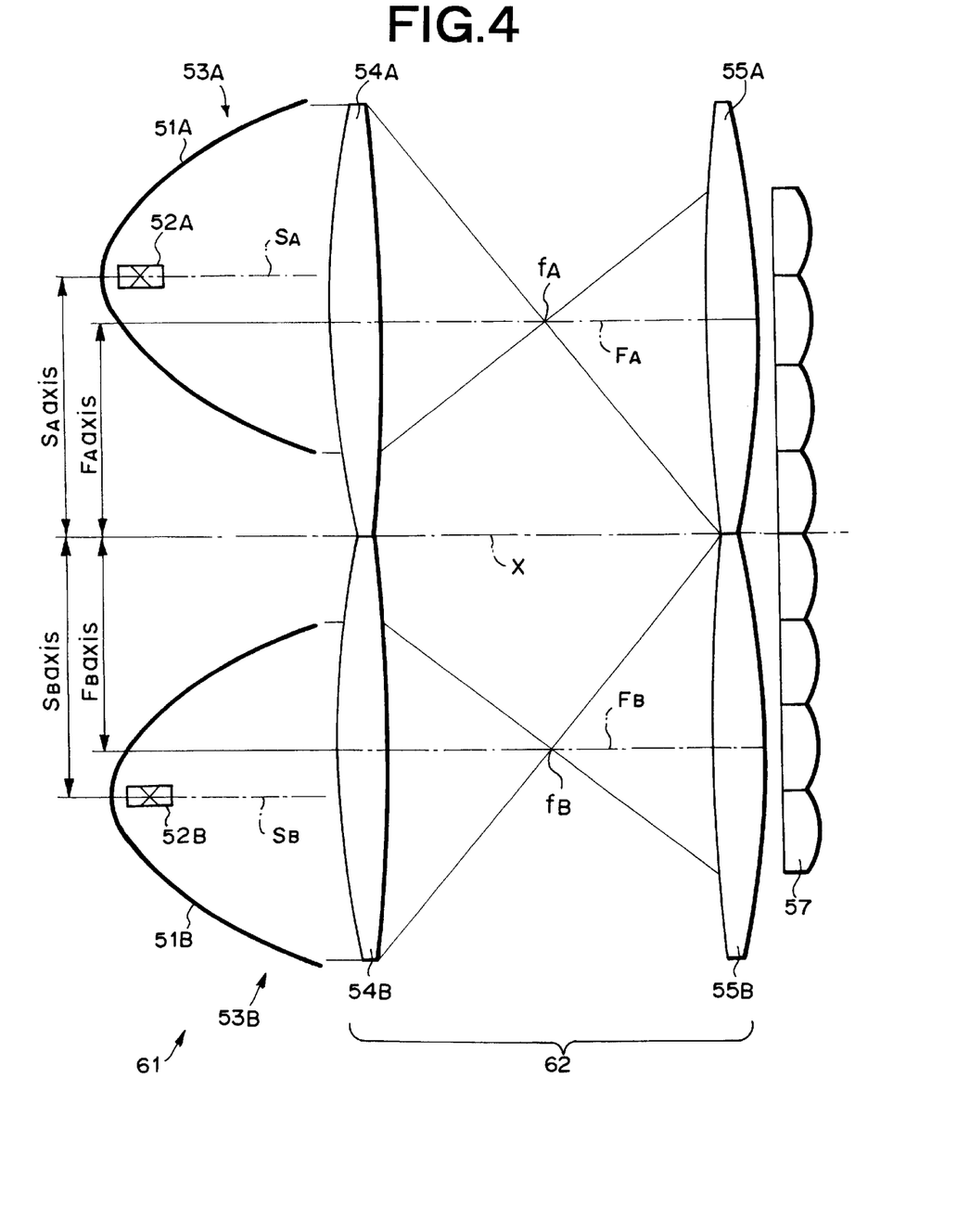
FIG. 4 is a schematic view showing the main part of the illumination apparatus in accordance with a second embodiment of the present invention.
Figure 5:
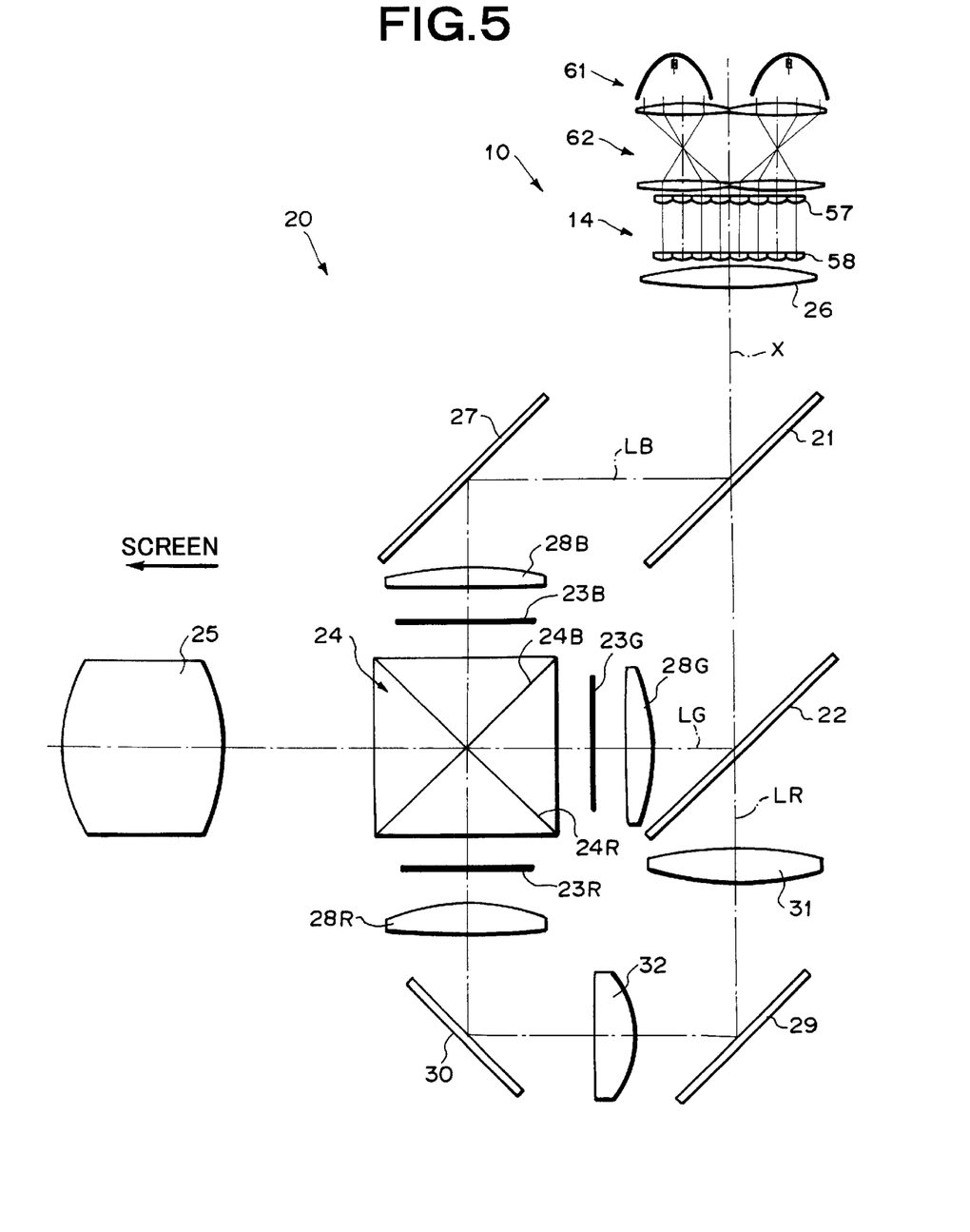
FIG. 5 is a schematic view showing the projection type display apparatus in accordance with the second embodiment of the present invention.

A second embodiment of the present invention will now be explained with reference to the drawings. FIG. 5 is a view showing the configuration of the projection type display apparatus comprising the illumination apparatus in accordance with the second embodiment. This projection type display apparatus comprises an illumination apparatus 10 in accordance with the second embodiment, and a projector section 20 for causing a luminous flux emitted from the illumination apparatus 10 and turned into uniform light to carry image information and projecting it onto a screen. FIG. 4 is an enlarged view of a part of the illumination apparatus 10 shown in FIG. 5. With reference to FIGS. 4 and 5, the illumination apparatus 10 will now be explained. In the illumination apparatus 10, a parallel luminous flux emitted from its light source group 61 is moved by a parallel luminous flux approaching optical system 62 so as to approach the optical axis of an integrator section 14, i.e., the optical axis X of the whole illumination apparatus, and then is mixed in the integrator section 14 so as to homogenize the light quantity distribution.

Here, the light source group 61 comprises a plurality of (two in this embodiment) light source sections 53A, 53B comprising luminous bodies 52A, 52B, each made of a discharge tube such as a xenon lamp or metal halide lamp, and reflectors 51A, 51B, each made of a parabolic mirror, arranged symmetrical about the optical axis X of the illumination apparatus 10. The light-emitting source of the luminous body 52A, 52B is disposed at the focal point of the reflector 51A, 51B made of a parabolic mirror. As a consequence, a part of the luminous flux emitted from the luminous body 52A, 52B toward the rear side and outside of the optical axis of the reflector 51A, 51B, i.e., the optical axis $S_A$, $S_B$ of the light source section 53A, 53B, is partly reflected as a luminous flux substantially parallel to the optical axis $S_A$, $S_B$.

The parallel luminous flux approaching optical system 62 comprises a plurality of first lens groups 54A (or 54B, similarly parenthesized in the following) corresponding to light source sections 53A (53B) one by one and function to cause the luminous flux from each light source section 53A (53B) to form a focal point (secondary light source image) once; and a secondary lens group 55A (55B), disposed downstream each focal point so as to emit the luminous flux from the light source section 53A (53B) as a substantially parallel luminous flux toward the integrator section 14. In FIG. 4, the second lens groups 55A and 55B are disposed so as face the first lens groups 54A and 54B, respectively. Namely, the focal points $f_A$, $f_B$ formed by the second lens groups 55A, 55B and first lens groups 54A, 54B are located on the optical axes $F_A$, $F_B$ of the first lens groups 54A, 54B, respectively.

In the second embodiment, each of the first lens groups 54A, 54B and second lens groups 55A, 55B is constituted by a single lens having a positive refracting power, whereas all these lenses are made of aspherical lenses having substantially the same form. The form of each aspheric surface is defined by the above-mentioned aspheric surface expression. In FIG. 4, the aspheric surface of each of the first lenses 54A, 54B is directed toward the light source group 61, whereas the aspheric surface of each of the second lenses 55A, 55B is directed toward the integrator section 14.

The integrator section 14 comprises two integrator plates and a field lens 26 which are arranged in the optical axis X direction. The luminous flux from the parallel luminous flux approaching optical system 62 is divided by a second flyeye 57 into partial luminous fluxes whose number is identical to the number of lens elements in the second flyeye 57, whereby tertiary light source images of the luminous bodies 52A, 52B are formed on individual lens elements constituting a first flyeye 58. These partial luminous fluxes are superposed onto the above-mentioned liquid crystal panel 23 by the first flyeye 58 and the field lens 26, whereby the light quantity is homogenized within a cross section of the illumination apparatus perpendicular to the optical axis X.

Here, the light source group 61, the parallel luminous flux approaching optical system 62, and integrator section 14 are configured such that the light source section 53A, for example, satisfies the following condition. Namely, the optical axis $S_A$ of the light source section 53A, the optical axis $F_A$ of the first lens group 54A forming a pair with the light source section 53A, and the optical axis of the integrator section 14, i.e., the optical axis X of the illumination apparatus 10, are substantially parallel to each other and satisfy the following conditional expression (1'):

$$S_A\text{axis} > F_A\text{axis} \tag{1}$$

where $_{SA}$axis is the distance between the optical axis X of the whole illumination apparatus and the optical axis $S_A$ of the light source section 53A; and $F_A$axis is the distance between the optical axis X of the whole illumination apparatus and the optical axis $F_A$ of the first lens group 54A.

When the above-mentioned conditions are satisfied, as shown in FIG. 4, the structure formed by the first lens group 54A for causing the parallel luminous flux from the light source section 53A to form a focal point once and the second lens group 55A, disposed downstream the focal point, for emitting the luminous flux again as a substantially parallel luminous flux toward the integrator section 14 acts so as to cause the output light from the light source section 53A to approach the optical axis X in the parallel luminous flux approaching optical system 62 in accordance with the second embodiment. Also, the luminous flux from the light source section 53B satisfies the conditional expression of $S_B$axis>$F_B$axis as the conditional expression (1') concerning B, and the parallel condition between the individual optical axes, whereby it can approach the optical axis X as shown in FIG. 4.

As depicted, it can be seen that, according to this action, the parallel luminous flux from the light source section 53A is translated by the parallel luminous flux approaching optical system 62 so as to approach the optical axis X of the illumination apparatus without changing the diameter of the parallel luminous flux. This action is similar to that carried out in the integrator section in the above-mentioned commonly-assigned conventional example, whereby similar effects can be obtained.

Namely, a part having a higher intensity will exist on the first flyeye 58 at a position separated from the optical axis X due to light-distributing characteristics of the light source if the parallel luminous flux approaching optical system 62 is not provided when a plurality of light source sections 53A, 53B are arranged symmetrical to each other about the optical axis so as to constitute the illumination apparatus 10. When utilized as a projection type display apparatus, however, the imaging performance of the downstream projection lens 25 is higher in the vicinity of the optical axis and gradually decreases in directions away therefrom. Therefore, in order to effectively utilize the imaging performance of the projection lens 25, it is desirable that a part having a higher intensity exist at a position near the optical axis X on the pupil surface.

In the second embodiment, substantially parallel luminous fluxes from a plurality of light source sections 53A, 53B are translated, so to speak, by the parallel luminous flux approaching optical system 62 in their respective directions approaching the optical axis X, so that the part having a higher intensity moves to positions near the optical axis X on the surface of the first flyeye 58 (conjugate with the pupil surface of the projection lens 25). Since the part having a stronger intensity is collected in the vicinity of the optical axis on the pupil surface of the projection lens 25 as such, the imaging performance of the projection lens 25 can be made favorable.

Such effects are substantially the same as those obtained by the projection type display apparatus disclosed in the above-mentioned commonly-assigned Japanese Unexamined Patent Publication No. 11-44920. However, this conventional example yields its effects by utilizing wedge-like prisms. According to the second embodiment, similar effects can be achieved by the parallel luminous flux approaching optical system 62 comprising at least two lenses with respect to one light source section, whereby the cost of making the members can greatly be lowered as compared with wedge-like prisms. Further, the lens members are easier to adjust in terms of precision when assembling the apparatus as compared with prism members, whereby the productivity can be improved, and the cost can be lowered.

Further, in the second embodiment, it is desirable that each of at least one first lens group and at least one second lens group be constituted by a single lens having substantially the same form. For example, as mentioned above, all of the lenses 54A, 54B, 55A, 55B constituting the parallel luminous flux approaching optical system 62 can be lenses having substantially the same form. Using the lenses having substantially the same form is advantageous to lowering the cost of making the members. While the use of lenses having the same form for all the lenses is unsuitable when performances are paramount, lenses having the same form can yield sufficiently satisfactory performances when they are considered in balance with the cost. When the lenses 54A, 54B, 55A, 55B are provided with aspheric surfaces, aberration corrections become favorable, whereby the illumination efficiency can be improved.

FIG. 5 shows a projection type display apparatus comprising the illumination apparatus 10 in accordance with the second embodiment. Its configuration on the downstream of the illumination apparatus 10 is substantially the same as that of the projection type display apparatus comprising the illumination apparatus 10 in accordance with the first embodiment. In the second embodiment and examples subsequent thereto, members having names and functions similar to those of the projection type display apparatus comprising the illumination apparatus 10 in accordance with the first embodiment will be referred to with numerals identical to those of the latter without repeating their detailed explanations.

In this projection type display apparatus, the illumination apparatus 10 is configured such that a plurality of light source sections 53A, 53B are arranged symmetrical about the optical axis, whereas a part having a higher intensity is moved to a position nearer to the optical axis X of the substantially parallel luminous flux incident on the second flyeye 57. Therefore, on the pupil surface of the projection lens 25 in the projection type display apparatus, which becomes conjugate with the surface of the first flyeye 58, the part having a higher intensity is collected in the vicinity of the optical axis, whereby a bright projection type display apparatus in which the projection lens 25 has a favorable imaging performance can be obtained.

Namely, the above-mentioned illumination apparatus 10 is configured such that, in the parallel luminous flux approaching optical system 62, the luminous flux from the light source section 53A, 53B is caused to form a focal point once by the first lens group 54A, 54B and is moved by the second lens group 55A, 55B so as to approach the optical axis X as a substantially parallel luminous flux and then be emitted to the integrator section 14. Two examples will be shown in the following as illumination apparatus which can exhibit such effects. These illumination apparatus can also be used as the illumination apparatus for the projection type display apparatus as with the illumination apparatus explained as the second embodiment. In the following explanation, FIG. 5 can be used concerning the configuration of the whole illumination apparatus and the projection type display apparatus.

EXAMPLE 1

Figure 6:
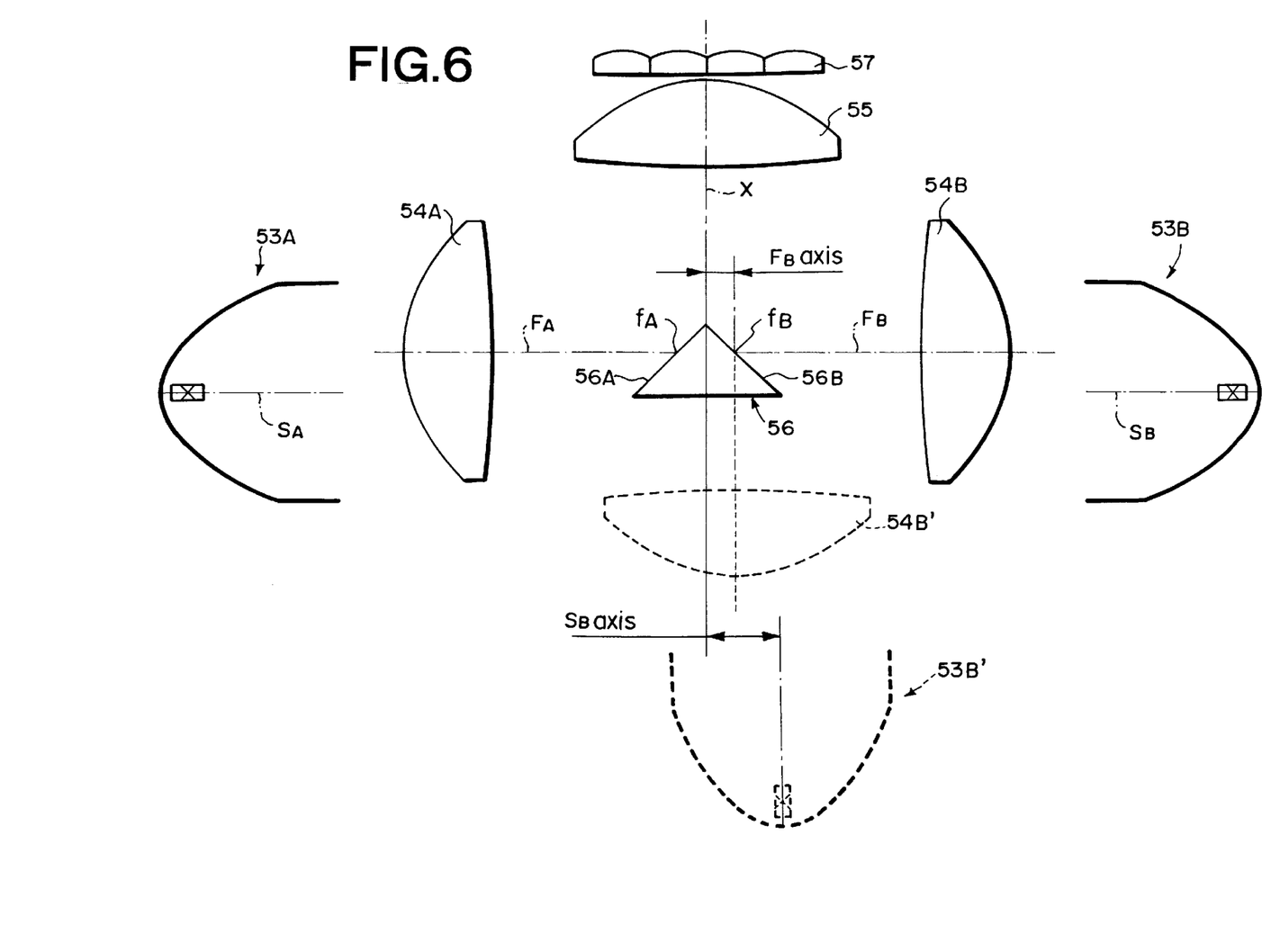
FIG. 6 is a schematic view showing the main part of the illumination apparatus in accordance with Example 1 of the second embodiment.

The illumination apparatus 10 in accordance with Example 1 shown in FIG. 6 is configured such that a mirror element 56 for reflecting luminous fluxes toward the second lens group 55 is disposed downstream the first lens groups 54A, 54B. Namely, in this example, the luminous fluxes from the light source sections 53A, 53B are reflected toward the second lens group 55 by the mirror element 56 having reflecting surfaces 56A, 56B near the focal points $f_A$, $f_B$ formed by the first lens groups 54A, 54B. The second lens group 55 is configured such that both of the luminous fluxes from the first lens groups 54A, 54B are made incident on the single second lens group 55, unlike the above-mentioned illumination apparatus in which the first lens groups 54A, 54B and second lens groups 55A, 55B oppose each other.

In this example, each of the first lens groups 54A, 54B and second lens group 55 is constituted by a single lens having a positive refracting power, whereas all these lenses are made of aspherical lenses having substantially the same form. The form of each aspheric surface is defined by the above-mentioned aspheric surface expression. The lenses used in FIG. 6 are similar to those exemplified in the first embodiment, so that the first lens groups 54A and 54B have their aspheric surfaces directed onto the light source section 61, whereas the second lens group 55 has its aspheric surface directed onto the second flyeye 57.

Also, in this example, the light source group 61, parallel luminous flux approaching optical system 62, and integrator section 14 are configured so as to satisfy the following conditions with respect to the light source sections 53A, 53B. Namely, the optical axis $S_\alpha$ of a given light source section 53α (where α is A or B), the optical axis $F_\alpha$ of the first lens group 54α forming a pair with the light source section 53α, and the optical axis of the integrator section 14, i.e., the optical axis X of the illumination apparatus 10, are substantially parallel to each other, and satisfy the following conditional expression (1"):

$$S_\alpha \text{axis} > F_\alpha \text{axis} \tag{1"}$$

where
  $S_\alpha$axis is the distance between the optical axis X of the whole illumination apparatus and the optical axis $S_\alpha$ of the light source section 53α; and
  $F_\alpha$axis is the distance between the optical axis X of the whole illumination apparatus and the optical axis $F_\alpha$ of the first lens group 54α.

In FIG. 6, for convenience of illustration, $S_B$axis and $F_B$axis are depicted by dotted lines according to the position 53B' of the light source section and the position 54B' of the first lens group in the case where the reflecting surface 56B is not disposed. Their values are constant regardless of whether the reflecting surface 56B exists or not, as a matter of course. Preferably, conditional expression (1") is satisfied not only for $S_B$axis and $F_B$axis concerning the light source section 53B shown in FIG. 6, but also for the light source section 53A.

When these conditions are satisfied, the structure formed by the first lens group 54A (54B) for causing the parallel luminous flux from the light source section 53A (53B) to form a focal point once and the second lens group 55, disposed downstream the focal point, for emitting the luminous flux toward the integrator 14 again as a substantially parallel luminous flux acts so as to cause the output light from the light source section 53A (53B) to approach the optical axis X in the parallel luminous flux approaching optical system 62 in accordance with this example as well.

In particular, according to this example, the mirror element 56 is inserted, whereby the luminous fluxes from the light source sections 53A, 53B are made incident on the second lens group 55 while being mostly superposed on each other, as compared with the illumination apparatus of FIG. 4. Thus, the parallel luminous flux approaching optical system 62 emits a substantially parallel luminous flux in which a part having a higher intensity distribution from the light source sections 53A, 53B is moved so as to further approach the optical axis X of the second lens group 55 and whole illumination apparatus, whereby the imaging performance of the projection lens 25 can further be made favorable. Namely, it is desirable that the individual members of the light source sections 53A, 53B, parallel luminous flux approaching optical system 62, and mirror element 56 be arranged such that the part of illumination light having a higher intensity is disposed as nearer as possible to the optical axis X of the illumination apparatus on the pupil surface (conjugate with the surface of the first flyeye 58) of the projection lens 25.

When the luminous fluxes from a plurality of light source sections 53A, 53B incident on the second lens 55 are mostly superposed on each other as in this example, the second lens group 55 may be made of at least one lens, so that the number of components can be cut down, whereby the cost can be lowered.

When the mirror element 56 is inserted as in this embodiment, both of the luminous fluxes from the light source sections 53A, 53B can be placed nearer to the optical axis X, and made incident on the second lens group 55 while in a state substantially superposed on each other. As a consequence, a bright illumination apparatus, equipped with two light source sections, which can cause the projection lens to fully exhibit its imaging performance can be obtained by a configuration easy to assemble at a low cost.

If similar luminous fluxes are presumed to be made incident on the second lens 55 without using the mirror element 56, the light source section 53A will be disposed at a position symmetrical about the optical axis X with respect to the position of the light source section 53B' indicated by the dotted line, which is physically difficult. This will explain the effect of the mirror element 56.

EXAMPLE 2

Figure 7A:
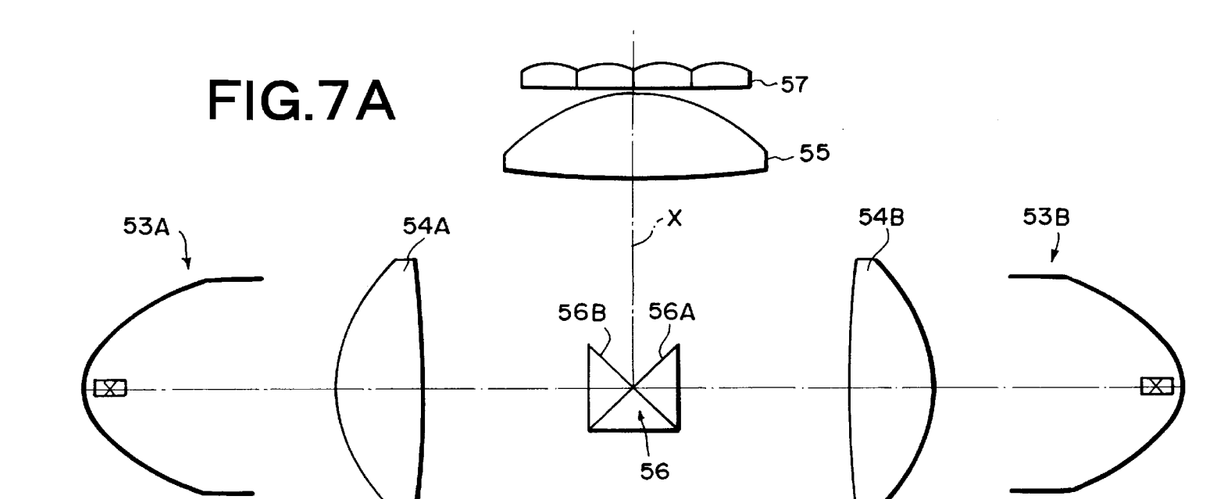
FIG. 7A is a schematic view showing the main part of the illumination apparatus in accordance with Example 2 of the second embodiment.
Figure 7B:
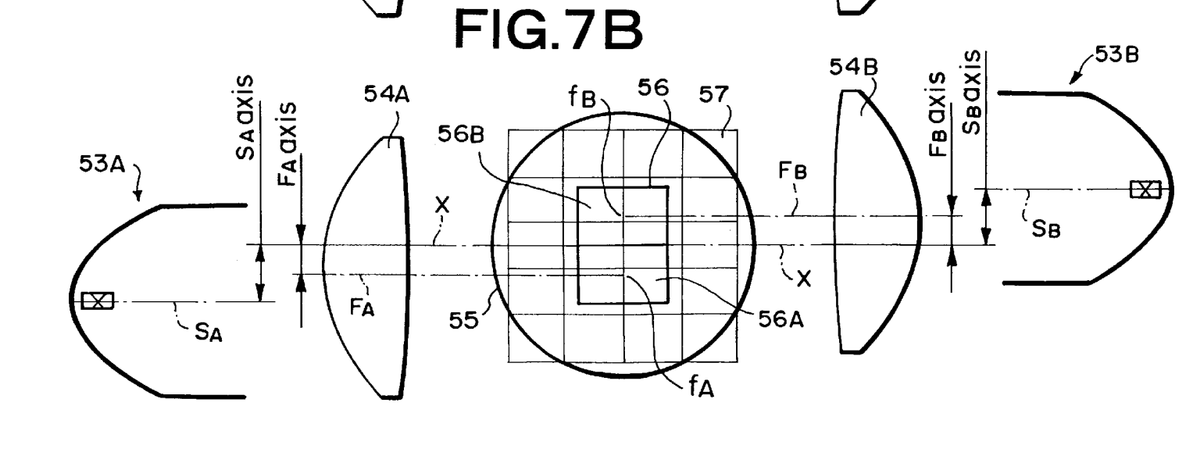
FIG. 7B is a schematic view of the part shown in FIG. 7A as seen from the second flyeye side.

FIGS. 7A and 7B show the illumination apparatus 10 in accordance with Example 2. FIG. 7A is a view of the illumination apparatus 10 as seen from a side thereof, whereas FIG. 7B is a view of the illumination apparatus 10 as seen from the second flyeye 57 side. This example is an illumination apparatus provided with the mirror element 56 as in Example 1, whereby the luminous fluxes from the light source sections 53A, 53B are reflected toward the second lens group 55 by the mirror element 56 having reflecting surfaces 56A, 56B near the focal points $f_A$, $f_B$ formed by the first lens groups 54A, 54B. The second lens group 55 is configured such that both of the luminous fluxes from the first lens groups 54A, 54B are made incident on the single second lens group 55. The effects obtained by inserting the mirror element 56 are not explained here since they are similar to Example 1.

In Example 2, each of the first lens groups 54A, 54B and second lens group 55 is constituted by a single lens having a positive refracting power, whereas these lenses are made of aspherical lenses having substantially the same form. The form of the aspheric surface and orientations of aspherical lenses are the same as those of the above-mentioned Example 1.

In Example 2, the light source group 61, parallel luminous flux approaching optical system 62, and integrator section 14 are configured so as to satisfy conditions similar to those of Example 1 concerning the light source sections 53A, 53B. When these conditions are satisfied, the structure formed by the first lens group 54A (54B) for causing the parallel luminous flux from the light source section 53A (53B) to form a focal point once and the second lens group 55, disposed downstream the focal point, for emitting the luminous flux toward the integrator 14 again as a substantially parallel luminous flux acts so as to cause the output light from the light source section 53A (53B) to approach the optical axis X in the parallel luminous flux approaching optical system 62 in accordance with Example 2 as well.

Figure 8A:
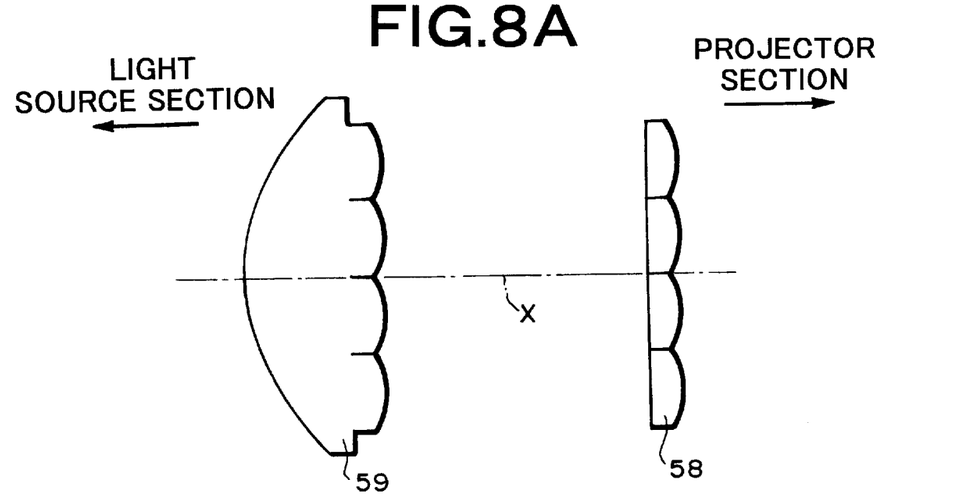
FIG. 8A is a view showing an integral lens corresponding to the illumination apparatus of FIGS. 6, 7A, and 7B.
Figure 8B:
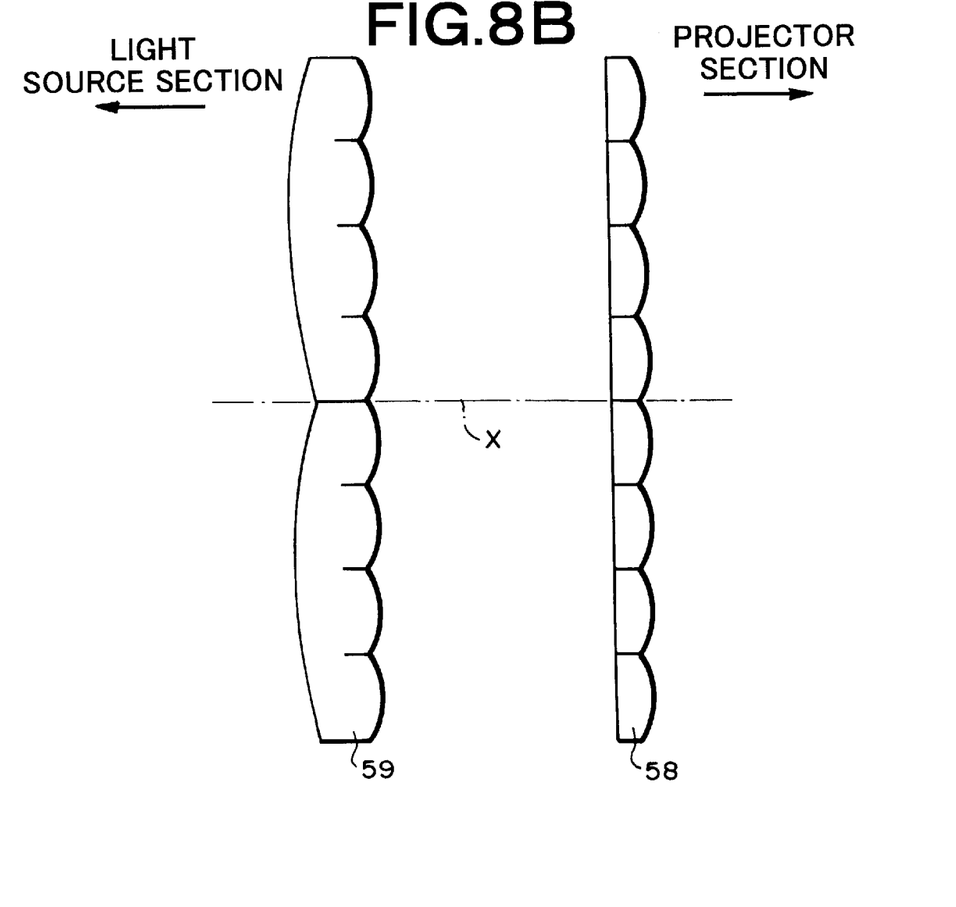
FIG. 8B is a view showing an integral lens corresponding to the illumination apparatus of FIG. 4.

FIGS. 8A and 8B are enlarged views of the second lens group 55 and second flyeye 57 when they are formed integrally in the illumination apparatus in accordance with the second embodiment. In the illumination apparatus of the present invention, the second lens group 55 and the second flyeye 57 on its downstream may be an integrated lens 59 in which the second lens group 55 is integrally formed on the surface of second flyeye 57 on the light source section 53 side as depicted. FIG. 8A shows an example of the integrated lens corresponding to the illumination apparatus of FIGS. 6, 7A, and 7B, whereas FIG. 8B shows an example corresponding to the illumination apparatus of FIG. 4. The manufacturing cost can be lowered when such an integrated lens 59 is made by monolithic molding using plastics, for example. Also, since there is no air interface between the lens of the second lens group 55 and the second flyeye 57, the illumination efficiency improves.

In the above-mentioned illumination apparatus, the parallel luminous fluxes incident on the first lens groups 54A, 54B are emitted from the second lens groups 55, 55A, 55B while having substantially the same diameter. Therefore, the lenses 54A, 54B, 55, 55A, 55B can utilize lenses having the same form. However, the configuration of the illumination apparatus in accordance with the second embodiment is not limited thereto. The diameters of luminous fluxes made incident on the first lens groups 54A, 54B and those of the substantially parallel luminous fluxes emitted from the second lens groups 55, 55A, 55B may also be configured such that the latter are proportionally enlarged or reduced.

Without being restricted to those mentioned above, the illumination apparatus and the projection type display apparatus using the same in accordance with the present invention can be modified in various manners. For example, the configurations and forms of lenses can be modified as appropriate. Also, the form of aspheric surface and which surface is to be formed aspheric can be determined arbitrarily.

Figure 3:
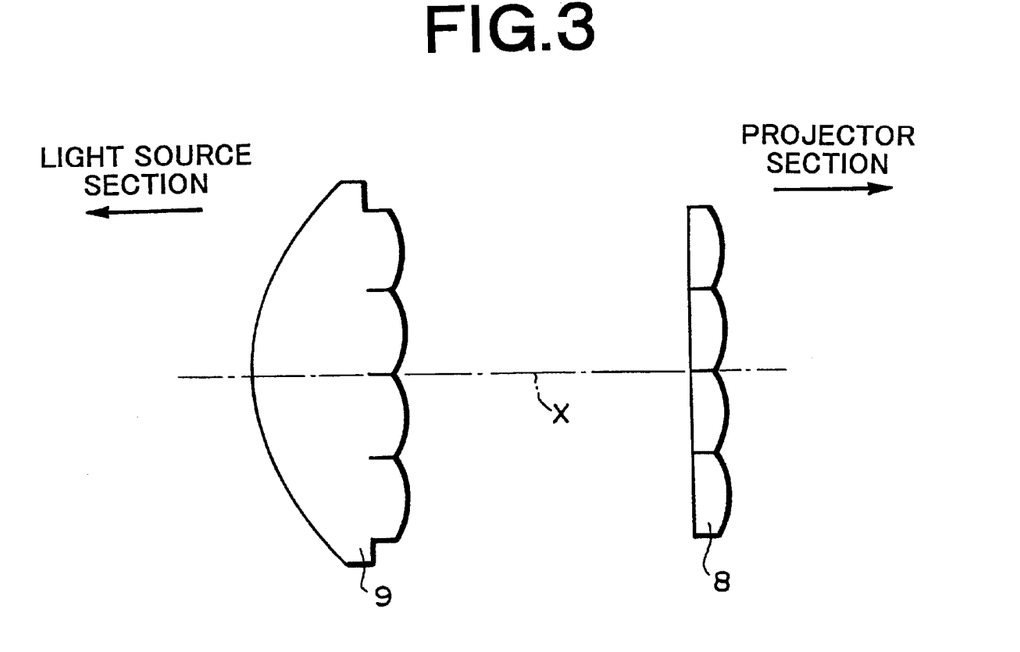
FIG. 3 is a schematic view showing an integrated lens employable in the illumination apparatus of FIG. 1.

FIG. 3 is an enlarged view of the lens 13 and second flyeye 7 when formed integrally in the illumination apparatus shown in FIG. 1. In the illumination apparatus of the first embodiment, the lens 13 and the second flyeye 7 downstream thereof may be formed as an integrated lens 9 in which the lens 13 is integrated with the second flyeye 7 on its surface directed onto the light source section 11 as depicted. When such an integrated lens 9 is made by monolithic molding from a plastic material, for example, the manufacturing cost can be lowered. Also, no air interface is formed between the lens 13 and the second flyeye 7, whereby the illuminating efficiency improves.

The number of light source sections in the illumination apparatus in accordance with the present invention is not limited to 2, whereby any number of 2 and greater can be selected. For example, four or nine light source sections can be provided. Known as an example of such a case is the conventional example disclosed in the above-mentioned commonly-assigned Japanese Unexamined Patent Publication No. 11-44920. Though this conventional example is configured such that a plurality of parallel luminous fluxes are moved so as to approach the optical axis of the illumination apparatus in the integrator section, the parallel luminous flux is moved so as to approach the optical axis X before being made incident on the integrator section 14 in accordance with the second embodiment. Therefore, the light spot formed on the first flyeye (conjugate with the pupil surface of the projection lens) in the conventional example corresponds to the light spot formed on the second flyeye 57 in the second embodiment. Namely, in accordance with the second embodiment, the size of the second flyeye 57 can be made smaller than that in the conventional example.

When the light spot formed by the luminous flux from one of a plurality of light source sections is positioned on the optical axis X, it is unnecessary for this light spot to be moved relative to the optical axis X, whereby this light source section may be free of means for moving the luminous flux. As the lens 13 disposed in front of the second flyeye 7, a plurality of lenses corresponding to different light sources may be provided according to the number of light source sections.

The form of the mirror element 12, 56 used in the illumination apparatus of the present invention is not limited to that mentioned above. Though it is desirable for the mirror element 12, 56 to have reflecting surfaces corresponding to the number of light source sections, the luminous fluxes from all the light source sections are not necessarily reflected by the mirror element 12, 56 so as to deflect their optical paths.

Though the above-mentioned embodiments relate to the case where images are projected after color-separating and color-combining operations in the projection type display apparatus, the present invention is also applicable to image-projecting apparatus carrying out neither color-separating nor color-combining operation as a matter of course.

As explained in the foregoing, the illumination apparatus in accordance with the first embodiment is an illumination apparatus in which a plurality of secondary light source images formed by reflectors each made of an ellipsoidal surface are reflected toward an integrator section by a mirror element, whereas the optical axis of the whole illumination apparatus and the optical axis of each reflector form a predetermined angle therebetween. Consequently, each luminous flux incident on the integrator section becomes a substantially parallel luminous flux in which a part having a higher optical intensity corresponding to the respective light source is superposed so as to substantially align with the optical axis of the illumination apparatus, whereby it is possible to obtain an illumination apparatus which can fully exhibit the imaging performance inherent in the projection lens and can be made smaller.

On the other hand, the illumination apparatus in accordance with the second embodiment comprises a parallel luminous flux approaching optical system comprising a plurality of first lens groups corresponding to a plurality of light source sections; and a second lens group, disposed downstream the focal point formed by each first lens group, for emitting a luminous flux as a substantially parallel luminous flux toward the integrator section; whereas the optical axis of the whole illumination apparatus and the optical axes of the light source section and first lens group forming a pair are substantially parallel to each other and satisfy the predetermined conditional expression. This makes it possible to yield, in a configuration easy to assemble at a low cost, an illumination apparatus which can move the parallel luminous fluxes from a plurality of light source sections so as to make each of them approach the optical axis of the illumination apparatus and incident on the integrator section.

Since the projection type display apparatus of the present invention comprises the above-mentioned illumination apparatus, the part having a greater light quantity in the luminous flux emitted from the integrator section is incident on the projection lens in the vicinity of the optical axis thereof. Therefore, the present invention can yield a projection type display apparatus which is capable of fully exhibiting the imaging performance of the projection lens. Also, in accordance with the second embodiment of the present invention, such a projection type display apparatus can be obtained in a configuration easy to assemble at a low cost.

TABLE 1

| | R | D | $N_e$ |
|---|---|---|---|
| 1 | 293.746 | 23.00 | 1.51872 |
| *2 | −40.327 | | |

Aspheric surface coefficient

| Surface | K | A | B | C | D |
|---|---|---|---|---|---|
| 2 | 0.4737 | $0.3466 \times 10^{-6}$ | $0.1039 \times 10^{-9}$ | $0.9008 \times 10^{-13}$ | 0.000 |

What is claimed is:

1. An illumination apparatus comprising:
   a light source group in which a plurality of light source sections, each constituted by a luminous body and a reflector comprising an ellipsoidal surface having one focal point located near a center of gravity of said luminous body, are arranged;
   an integrator section, constituted by at least two integrator plates, for homogenizing a quantity of light emitted from said light source group, said integrator section being arranged in an optical axis direction of said light; and
   at least one mirror element, having a reflecting surface near the other focal point of said ellipsoidal surface of at least one said reflector, for reflecting a luminous flux from said light source group toward said integrator section;
   wherein said illumination apparatus as a whole has an optical axis forming a predetermined angle which is not nearly or substantially parallel with an optical axis of said at least one reflector.

2. An illumination apparatus according to claim 1, wherein at least one lens for emitting said luminous flux from said mirror element toward said integrator section as a substantially parallel luminous flux is disposed on said mirror element side of said integrator section.

3. An illumination apparatus according to claim 2, wherein said at least one lens is formed integrally with said integrator plate on said mirror element side in said integrator section on the surface of said integrator plate facing said mirror element.

4. An illumination apparatus according to claim 3, wherein said at least one lens is formed integrally with said integrator plate from a plastic material.

5. An illumination apparatus according to claim 2, wherein said at least one lens has an aspheric surface.

6. An illumination apparatus according to claim 2, wherein said light source group comprises at least two light source sections arranged such that respective luminous fluxes therefrom are incident on said lens at an angle by which a center axis of each of said luminous fluxes substantially intersects said optical axis of said lens.

7. An illumination apparatus according to claim 1, wherein said light source group comprises at least two light source sections, whereas said mirror element has a reflecting surface near the other focal point of said ellipsoidal surface of each of said reflectors of said two light source sections so as to reflect said luminous flux from said light source group toward said integrator section.

8. A projection type display apparatus comprising the illumination apparatus according to claim 1, a light valve for modulating output light from said integrator section according to predetermined image information, and a projection lens for projecting onto a screen an optical image formed by said light modulated by said light valve.

9. An illumination apparatus comprising:

a light source group in which a plurality of light source sections, each constituted by a luminous body and a reflector comprising a parabolic surface for emitting a luminous flux from said luminous body to a front side of an optical axis, are arranged;

an integrator section, constituted by at least two integrator plates, for homogenizing in a cross section perpendicular to said optical axis a quantity of light emitted from said light source group, said integrator section being arranged in said optical axis direction; and a parallel luminous flux approaching optical system comprising a plurality of first lens groups corresponding to said plurality of light source sections in said light source group substantially one by one and functioning to cause each of said luminous fluxes from said plurality of light source sections to form a focal point once; and at least one second lens group, disposed downstream said focal point, for emitting said luminous fluxes from said light source group toward said integrator section as a substantially parallel luminous flux;

wherein the optical axis of the whole illumination apparatus and optical axes of said light source section and first lens group forming a pair are substantially parallel to each other and satisfy the following conditional expression (1):

$$\text{Saxis} > \text{Faxis} \tag{1}$$

where

Saxis is the distance between the optical axis of the whole illumination apparatus and the optical axis of the light source section; and Faxis is the distance between the optical axis of the whole illumination apparatus and the optical axis of the first lens group.

10. An illumination apparatus according to claim 9, wherein at least one mirror element, having a reflecting surface near at least one of the plurality of focal points caused by said plurality of first lens groups, for reflecting a luminous flux toward said second lens group is provided.

11. An illumination apparatus according to claim 10, wherein said light source group comprises two light source sections; and wherein said mirror element having reflecting surfaces near two focal points caused by said first lens groups corresponding to said light source sections one by one is provided.

12. An illumination apparatus according to claim 9, wherein each of at least one of said first lens groups and said at least one second lens group is constituted by a single lens having substantially the same form.

13. An illumination apparatus according to claim 9, wherein at least one of said first and second lens groups is made of a single aspherical lens.

14. An illumination apparatus according to claim 9, wherein said at least one second lens group is integrally formed with said integrator plate on said light source group side in said integrator section at the surface thereof on said light source group side.

15. A projection type display apparatus comprising the illumination apparatus according to claim 9, a light valve for modulating output light from said integrator section according to predetermined image information, and a projection lens for projecting onto a screen an optical image formed by said light modulated by said light valve.

16. An illumination apparatus comprising:

a light source group in which a plurality of light source sections, each constituted by a luminous body and a reflector comprising an ellipsoidal surface having one focal point located near a center of gravity of said luminous body, are arranged;

an integrator section, constituted by at least two integrator plates, for homogenizing a quantity of light emitted from said light source group, said integrator section being arranged in an optical axis direction of said light; and at least one mirror element, having a reflecting surface near the other focal point of said ellipsoidal surface of at least one said reflector, for reflecting a luminous flux from said light source group toward said integrator section;

wherein said illumination apparatus as a whole has an optical axis forming a predetermined angle with an optical axis of said at least one reflector;

wherein at least one lens for emitting said luminous flux from said mirror element toward said integrator section as a substantially parallel luminous flux is disposed on said mirror element side of said integrator section, and wherein said illumination apparatus as a whole has an optical axis intersecting an axis of the luminous flux from said at least one reflector from each other in the vicinity of the incident surface of said lens.

* * * * *